US012657020B2

(12) United States Patent
Singh et al.

(10) Patent No.: US 12,657,020 B2
(45) Date of Patent: Jun. 16, 2026

(54) SYSTEM AND METHOD FOR AUTOMATICALLY GENERATING CODE FOR SOFTWARE CODE UPDATES

(71) Applicant: Bank of America Corporation, Charlotte, NC (US)

(72) Inventors: Sidharth Singh, Fort Mill, SC (US); Gaurav Kumar Chaubey, Lucknow (IN); Varun Vidyadharan Ezhava, Hyderabad (IN); Maneesh Kumar Sethia, Hyderabad (IN); Naveen Reddy Mamidi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 18/630,576

(22) Filed: Apr. 9, 2024

(65) Prior Publication Data

US 2025/0315242 A1    Oct. 9, 2025

(51) Int. Cl.
*G06F 8/65* (2018.01)

(52) U.S. Cl.
CPC ..................................... *G06F 8/65* (2013.01)

(58) Field of Classification Search
CPC ..................................... G06F 8/65; G06F 8/30
See application file for complete search history.

(56) References Cited

U.S. PATENT DOCUMENTS

| | | | |
|---|---|---|---|
| 9,996,810 B2 | 6/2018 | Augenstein et al. | |
| 10,209,963 B2 | 2/2019 | Hutchison | |
| 10,210,170 B2 | 2/2019 | Kuhtz et al. | |
| 10,241,965 B1 | 3/2019 | Caudy et al. | |
| 10,331,495 B2 | 6/2019 | Bequet et al. | |
| 10,484,506 B2 | 11/2019 | Faizanullah et al. | |
| 10,552,161 B2 | 2/2020 | Bao et al. | |
| 10,572,474 B2 | 2/2020 | Wright et al. | |
| 10,817,279 B1 | 10/2020 | Wang et al. | |
| 10,949,261 B2 | 3/2021 | Yang et al. | |
| 11,914,933 B2 | 2/2024 | Chen | |
| 2019/0303541 A1 | 10/2019 | Reddy et al. | |
| 2019/0303579 A1 | 10/2019 | Reddy et al. | |
| 2019/0305957 A1 | 10/2019 | Reddy et al. | |
| 2019/0305959 A1 | 10/2019 | Reddy et al. | |
| 2019/0347424 A1* | 11/2019 | Bezzi | G06F 21/577 |
| 2020/0301898 A1 | 9/2020 | Samynathan et al. | |
| 2021/0406068 A1 | 12/2021 | Chen et al. | |

(Continued)

*Primary Examiner* — Phillip H Nguyen

(57) ABSTRACT

A system includes a memory and processors operably coupled to the memory and configured to receive a request for a software code change to one or more of a first instance of a software application or a plurality of second instances of a software application. The first instance of the software application is represented as a first node of a directed acyclic graph (DAG) and each instance of the plurality of second instances of the software application is represented as one of a plurality of second nodes of the DAG. The processors are further configured to identify relationships between each node impacted by the requested software code change. The processors are further configured to execute a first machine-learning model and a second machine-learning model to generate a prediction of textual software code based on a knowledge graph. The textual software code is to be deployed for updating each node.

20 Claims, 3 Drawing Sheets

(56) References Cited

U.S. PATENT DOCUMENTS

| | | | | |
|---|---|---|---|---|
| 2021/0406152 A1* | 12/2021 | Quemy | ............... | G06F 11/3624 |
| 2022/0414252 A1 | 12/2022 | Beecham | | |
| 2023/0119331 A1 | 4/2023 | Glass et al. | | |
| 2023/0239284 A1 | 7/2023 | Simic et al. | | |
| 2023/0376297 A1* | 11/2023 | Ji | ............................. | G06F 8/65 |
| 2024/0427656 A1* | 12/2024 | Byron | ................ | G06F 11/3692 |
| 2025/0094156 A1* | 3/2025 | Ji | ............................. | G06F 8/65 |
| 2025/0208975 A1* | 6/2025 | Eitan | .................. | G06F 11/3608 |

* cited by examiner

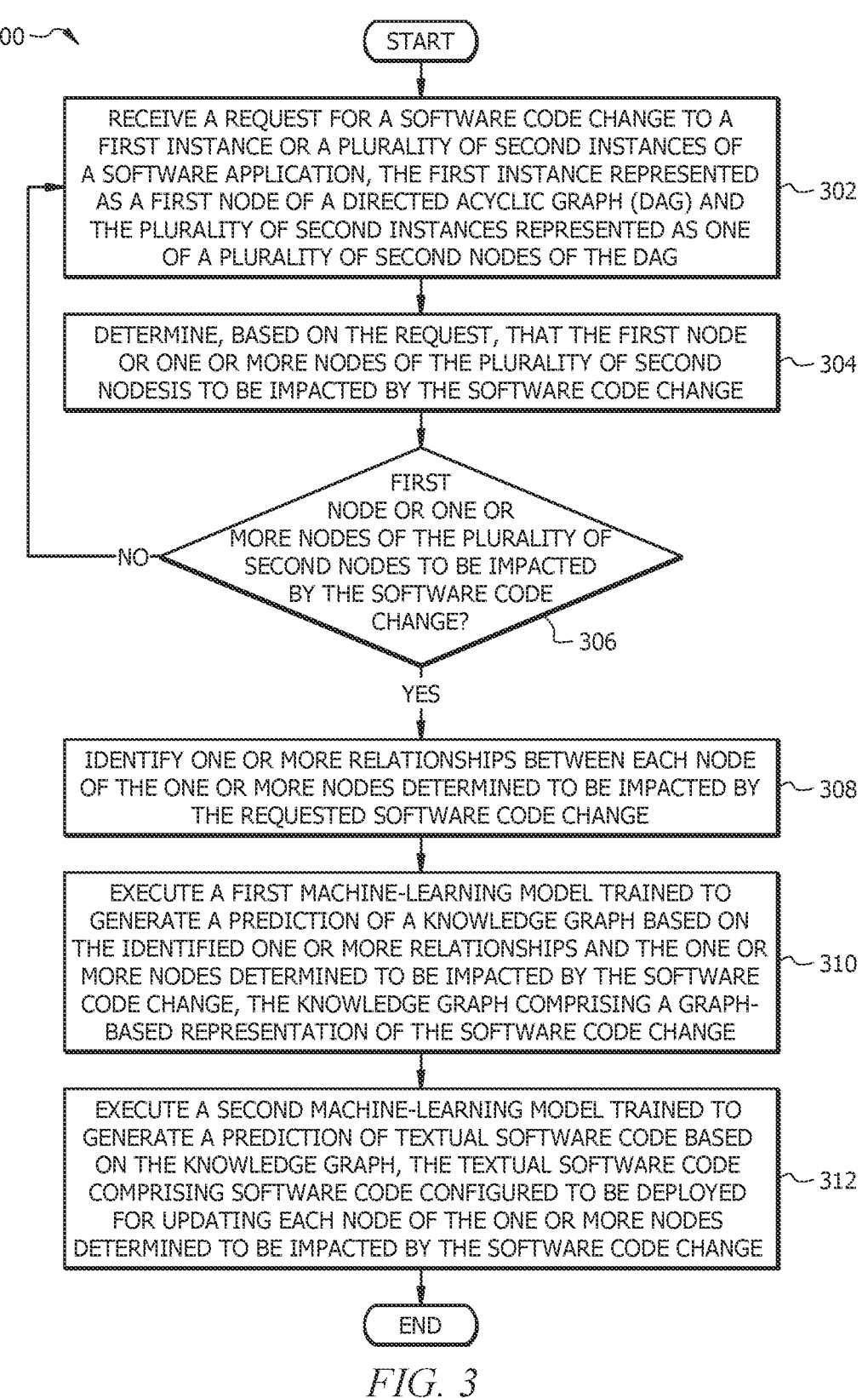

300

START

RECEIVE A REQUEST FOR A SOFTWARE CODE CHANGE TO A
FIRST INSTANCE OR A PLURALITY OF SECOND INSTANCES OF
A SOFTWARE APPLICATION, THE FIRST INSTANCE REPRESENTED
AS A FIRST NODE OF A DIRECTED ACYCLIC GRAPH (DAG) AND
THE PLURALITY OF SECOND INSTANCES REPRESENTED AS ONE
OF A PLURALITY OF SECOND NODES OF THE DAG — 302

DETERMINE, BASED ON THE REQUEST, THAT THE FIRST NODE
OR ONE OR MORE NODES OF THE PLURALITY OF SECOND
NODESIS TO BE IMPACTED BY THE SOFTWARE CODE CHANGE — 304

FIRST
NODE OR ONE OR
MORE NODES OF THE PLURALITY OF
SECOND NODES TO BE IMPACTED
BY THE SOFTWARE CODE
CHANGE? — 306

NO

YES

IDENTIFY ONE OR MORE RELATIONSHIPS BETWEEN EACH NODE
OF THE ONE OR MORE NODES DETERMINED TO BE IMPACTED BY
THE REQUESTED SOFTWARE CODE CHANGE — 308

EXECUTE A FIRST MACHINE-LEARNING MODEL TRAINED TO
GENERATE A PREDICTION OF A KNOWLEDGE GRAPH BASED ON
THE IDENTIFIED ONE OR MORE RELATIONSHIPS AND THE ONE OR
MORE NODES DETERMINED TO BE IMPACTED BY THE SOFTWARE
CODE CHANGE, THE KNOWLEDGE GRAPH COMPRISING A GRAPH-
BASED REPRESENTATION OF THE SOFTWARE CODE CHANGE — 310

EXECUTE A SECOND MACHINE-LEARNING MODEL TRAINED TO
GENERATE A PREDICTION OF TEXTUAL SOFTWARE CODE BASED
ON THE KNOWLEDGE GRAPH, THE TEXTUAL SOFTWARE CODE
COMPRISING SOFTWARE CODE CONFIGURED TO BE DEPLOYED
FOR UPDATING EACH NODE OF THE ONE OR MORE NODES
DETERMINED TO BE IMPACTED BY THE SOFTWARE CODE CHANGE — 312

END

*FIG. 3*

SYSTEM AND METHOD FOR AUTOMATICALLY GENERATING CODE FOR SOFTWARE CODE UPDATES

TECHNICAL FELD

The present disclosure relates generally to computing systems, and, more specifically, to a system and method for automatically generating code for software code updates.

BACKGROUND

A software development life cycle (SDLC) generally includes a phase-by-phase process or project management and development framework utilized by software development teams to design and build useful software applications and systems. For example, a typical SDLC may include a planning phase, a design phase, a development phase, a testing phase, a deployment phase, and a maintenance phase. In many instances, after software applications or systems are deployed, one or more software code changes may be requested and executed by software engineers or software developers.

SUMMARY

The system and methods implemented by the system as disclosed in the present disclosure provide technical solutions to the technical problems discussed above by providing systems and methods for automatically generating code for software code updates. The disclosed system and methods provide several practical applications and technical advantages. Specifically, the present embodiments improve the security, reliability, and maintainability of software applications, systems, and services, as well as the one or more processors and memory on which the software applications, systems, and services may be executed by identifying a software code change requested to be deployed, identifying the upstream or downstream instances of the software application to be impacted by the software code change, and autonomously executing a code generation generative model to generate a prediction of the software code change as a graph-based representation and further generate a prediction of the generative software code to update the impacted upstream or downstream instances of the software application.

Thus, the present embodiments may mitigate the potential for software application bugs, software application faults, software service outages, or other systemic adverse impacts that may be associated with code changes to software applications, systems, and services once tested and deployed. The present embodiments may further streamline the software development, testing, and maintenance phases of an SDLC by autonomously generating and deploying software code for otherwise repetitive and cumbersome coding tasks. That is, the present embodiments identifies a software code change requested and the upstream or downstream instances of the software application to be impacted by the software code change, and then autonomously executes a code generation generative model to generate a prediction of the software code for changing the codebase or source code for the upstream or downstream instances of the software application to be impacted by the requested software code change without additional user intervention.

The present embodiments are directed to systems and methods for automatically generating code for software code changes. In particular embodiments, one or more processors of a system may receive a request for a software code change to one or more of a first instance of a software application or a plurality of second instances of a software application. In particular embodiments, the first instance of the software application may be represented as a first node of a directed acyclic graph (DAG) and each instance of the plurality of second instances of the software application may be represented as one of a plurality of second nodes of the DAG. In one embodiment, the first node of the DAG may include a global node. In one embodiment, the plurality of second nodes of the DAG may include a set of nodes having one or more dependencies on the global node.

In particular embodiments, the one or more processors may then determine, based on the request, that the first node or one or more nodes of the plurality of second nodes may be impacted by the requested software code change. In particular embodiments, in response to determining that the first node or one or more nodes of the plurality of second nodes is to be impacted by the requested software code change, the one or more processors may then identify one or more relationships between each node of the one or more nodes determined to be impacted by the requested software code change. In particular embodiments, the one or more processors may then execute a first machine-learning model trained to generate a prediction of a knowledge graph based on the identified one or more relationships and the one or more nodes determined to be impacted by the requested software code change.

For example, in one embodiment, the knowledge graph may include a graph-based representation of the requested software code change. In one embodiment, the first machine-learning model may include one or more of a graph neural network (GNN) or a graph convolutional network (GCN). In particular embodiments, the one or more processors may then execute a second machine-learning model trained to generate a prediction of textual software code based on the knowledge graph. In one embodiment, the textual software code may include software code configured to be deployed for updating each node of the one or more nodes determined to be impacted by the requested software code change.

In particular embodiments, the second machine-learning model may include one or more of a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, a generative pre-trained transformer (GPT) model, or a graph transformer.

In particular embodiments, the one or more processors may further execute the first machine-learning model trained to generate one or more node property predictions or one or more edge predictions corresponding to the graph-based representation of the requested software code change. In particular embodiments, the one or more processors may then deploy the textual software code to update each node of the one or more nodes determined to be impacted by the requested software code update. In one embodiment, the one or more processors may then update the DAG based at least in part on the updated nodes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates a flowchart of an example method for automatically generating code for software code changes, in accordance with one or more embodiments of the present disclosure.

DETAILED DESCRIPTION

Example System

Figure 1:
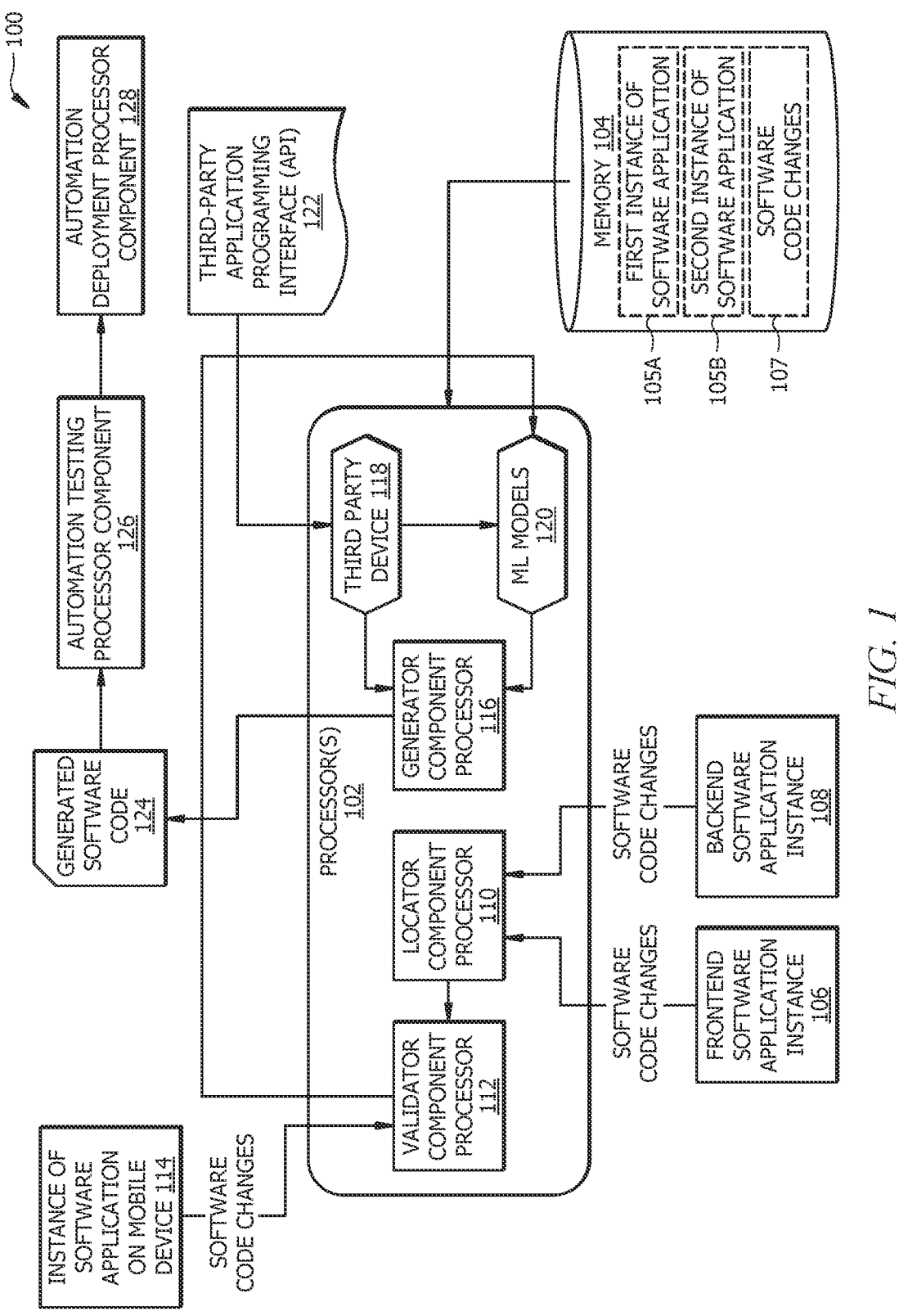
FIG. 1 is a schematic diagram of an integrated software development system, in accordance with certain aspects of the present disclosure.

FIG. 1 is a schematic diagram of an integrated software development environment and system 100 for automatically generating code for software code changes, in accordance with certain aspects of the present disclosure. As depicted, the integrated software development environment and system 100 may include one or more processors 102 and a memory 104, which may be utilized in conjunction to automatically generate code for software code changes in accordance with the presently disclosed embodiments. The one or more processors 102 may be operably coupled to the memory 104.

For example, the one or more processors 102 may include any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). In some embodiments, the one or more processors 102 may be a programmable logic device, a microcontroller, a microprocessor, or any suitable combination of the preceding.

The one or more processors 102 may be further communicatively coupled to and in signal communication with the memory 104. The one or more processors may be configured to process data and may be implemented in hardware or software. For example, the one or more processors 102 may be 8-bit, 16-bit, 32-bit, 64-bit or of any other suitable architecture. The one or more processors 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors 102 may be further configured to implement various instructions. For example, the one or more processors 102 may be configured to execute instructions stored by the memory 104. In such instances, the one or more processors 102 may be a special-purpose computer designed to implement and execute the functions disclosed herein.

The memory 104 may include one or more disks, tape drives, or solid-state drives, and may be used as an over-flow data storage device, to store programs when such programs are selected for execution, and to store instructions and data that are read during program execution. The memory 104 may be volatile or non-volatile and may include a read-only memory (ROM), random-access memory (RAM), ternary content-addressable memory (TCAM), dynamic random-access memory (DRAM), static random-access memory (SRAM), and so forth. In one embodiment, the memory 104 may include a non-transitory computer-readable medium. As further depicted by the integrated software development environment and system 100 of FIG. 1, in particular embodiments, the memory 104 may be operable to store a first instance of the software application 105A and a second instance of the software application 105B.

For example, in one embodiment, the first instance of the software application 105A may include a frontend of a software application 106 and the second instance of the software application 105B may include a backend of a software application 108. While the frontend of the software application 106 and backend of the software application 108 may be labeled as a "frontend" and "backend," respectively, it should be appreciated that the backend of the software application 108 may include any instance of a software application, a software system, or a software service on which the frontend of the software application 106 or the mobile device instance of the software application 114 may be dependent.

The memory 104 may be further operable to store requested software code changes 107. For example, in one embodiment, the requested software code changes 107 may include any requested changes to a codebase or source code impacting one or more of the frontend of the software application 106, the backend of the software application 108, or the mobile device instance of the software application 114. In particular embodiments, the requested software code changes 107 may be requested and instantiated by one or more software developers or software engineers associated with the design, implementation, testing, or deployment of one or more of the frontend of the software application 106, the backend of the software application 108, or the mobile device instance of the software application 114.

As further depicted by the integrated software development environment and system 100 of FIG. 1, the one or more processors 102 may include a locator component processor 110, a validator component processor 112, and a generator component processor 116. Although these processors 110, 112, and 116 are illustrated as separate components, they may be implemented in any suitable number and combination of processors to suitable particular tasks of the integrated software development system 100. The locator component processor 110 may access any requested software code changes 107 that may be associated with the frontend of the software application 106 or the backend of the software application 108. The locator component processor 110 may then provide any requested software code changes 107 that may be associated with the frontend of the software application 106 or the backend of the software application 108 to the validator component processor 112.

As further depicted by the integrated software development environment and system 100 of FIG. 1, the validator component processor 112 may access any software code changes that may be associated with the mobile device instance of a software application 114. For example, in one embodiment, the mobile device instance of a software application 114 may include a mobile application instance of the software application suitable for executing on a mobile electronic device. In particular embodiments, the validator component processor 112 may provide any software code changes 107 that may be associated with one or more of the frontend of the software application 106, the backend of the software application 108, or the mobile device instance of the software application 114 to one or one or more machine-learning models 120. Similarly, a third-party device 118 may access any requested software code changes 107 that may be associated with a third-party application programming interface (API) 122.

In particular embodiments, as further depicted by FIG. 1, the one or more processors 102 may execute the one or more machine-learning models 120 that may be utilized to generate generative software code 124. For example, in one embodiment, in response to receiving the requested software code changes 107 and identifying application instances to be impacted by the requested software code changes 107, the generator component processor 116 may execute the one or more machine-learning models 120 to generate the generative software code 124. For example, as will be discussed in greater detail below with respect to FIG. 2, the one or more machine-learning models 120 may include one or more generative artificial intelligence (AI) models that may be suitably trained for generating a prediction of the generative software code 124 for automatically updating the codebase or source code of one or more of the frontend of the software application 106, the backend of the software application 108, or the mobile device instance of the software application 114 based on whether any of these instances of the software application is impacted by the requested software code changes 107.

In particular embodiments, the generator component processor 116 may then provide the generative software code 124 to an automation testing processor component 126. For example, the automation testing processor component 126 may be utilized to test and validate the generative software code 124. The automation testing processor component 126 may then provide the tested and validated generative software code 124 to an automation deployment processor component 128. For example, the automation deployment processor component 128 may be utilized to execute and deploy the generative software code 124 for automatically updating the codebase or source code of one or more of the frontend of the software application 106, the backend of the software application 108, or the mobile device instance of the software application 114 based on whether any of these instances of the software application is impacted by the requested software code changes 107.

Automatically Generating Code for Software Code Changes

Embodiments of the present disclosure discuss techniques for automatically generating code for software code changes.

Figure 2:
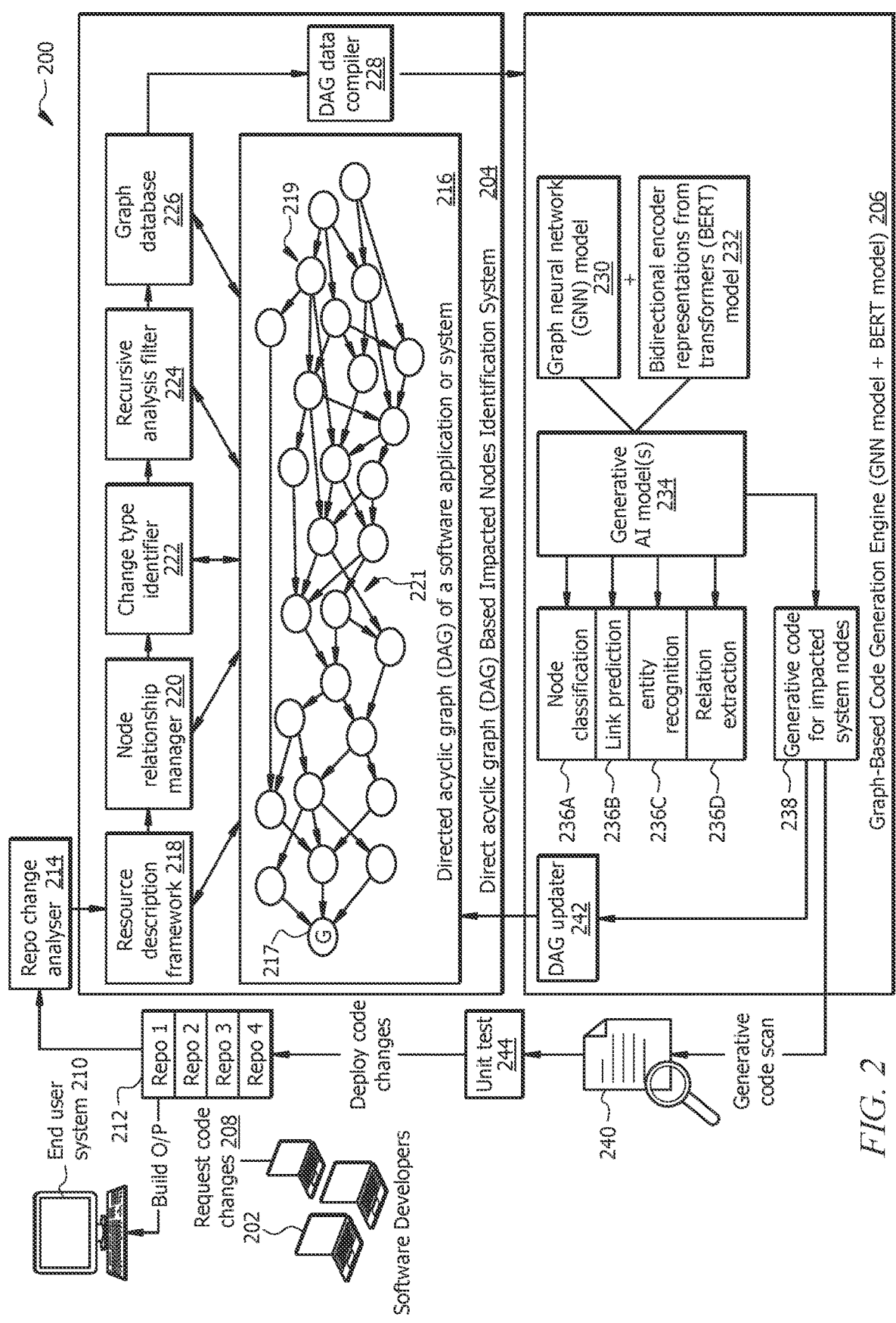
FIG. 2 illustrates a block diagram of an embodiment of a direct acyclic graph (DAG) and generative code generation system, in accordance with one or more embodiments of the present disclosure.

FIG. 2 illustrates a block diagram of an embodiment of a direct acyclic graph (DAG) and generative code generation system 200 for automatically generating code for software code changes, in accordance with certain aspects of the present disclosure. As depicted, the DAG and generative code generation system 200 may include one or more software developer computing devices 202, a direct acyclic graph (DAG) based impacted nodes identification system 204, a graph-based code generation engine 206, one or more end user computing devices 210, and one or more codebase repositories 212.

In particular embodiments, a software developer may submit one or more software code change requests 208 to the codebase repositories 212 by way of the one or more software developer computing devices 202. For example, in one embodiment, the one or more software code change requests 208 may include any requested change to the codebase or source code (e.g., on a line-by-line basis) of a large software application, software service, or software system that includes at least one upstream host application (e.g., backend) and any number of downstream instances (e.g., frontend, host application programming interface (API), third-party application, third-party API, and so forth) of the software application or software system dependent on the upstream host application (e.g., backend).

In particular embodiments, the codebase repositories 212 may include any number of databases suitable for storing and maintaining the codebase or source code of a large software application or software system. In accordance with the presently disclosed embodiments, any newly requested software code change to the codebase or source code as stored and maintained by the codebase repositories 212 may necessitate a corresponding software code change to one or more of the number of downstream instances (e.g., frontend, host API, third-party application, third-party API, and so forth) of the software application or software system. In particular embodiments, as further depicted by the DAG and generative code generation system 200, upon the one or more software code change requests 208 being submitted to the codebase repositories 212, a repository change analyzer 214 may retrieve from the codebase repositories 212 the one or more software code change requests 208 and then provide the one or more software code change requests 208 to the DAG based impacted nodes identification system 204.

In particular embodiments, the DAG based impacted nodes identification system 204 may include a direct acyclic graph (DAG) of a software application or system 216, a resource description framework (RDF) 218, a node relationship manager 220, a code change type identifier 222, a recursive analysis filter 224, and a graph database 226. In one embodiment, the DAG of a software application or system 216 may include, for example, a Dirichlet-Multinomial model in which the directed acyclic graph (DAG) includes a global node 217 (e.g., independent node) and a set of dependent nodes 219 each interconnected by one or more directed links 221. As illustrated, each of the set of dependent nodes 219 may directly or indirectly depend on the global node 217.

Specifically, in accordance with the presently disclosed embodiments, the global node 217 may, in one example, be representative of an upstream host software application or software system (e.g., backend), and the set of dependent nodes 219 may similarly be representative of a number of downstream instances (e.g., frontend, host API, third-party application, third-party API, and so forth) of the software application or software system. The directed links 221 may be representative of the respective dependencies and/or relationships of the set of dependent nodes 219 with respect to each other and further with respect to the global node 217.

In some embodiments, the global node 217 and the set of dependent nodes 219 may each include one or more discrete values estimated from a range of probability distributions associated with each of the global node 217 and the set of dependent nodes 219. As will be further appreciated below, as the global node 217 may be representative of a host software application or software system and the set of dependent nodes 219 may be representative of a number of dependent instances of the software application or software system, in some embodiments, the DAG of a software application or system 216 may be suitable for being inputted to one or more graph neural networks (GNNs) to generate one or more predictions based on one or more of the global node 217, the set of dependent nodes 219, and/or the directed links 221 of the DAG of a software application or system 216.

In particular embodiments, the RDF 218 may receive from the repository change analyzer 214 the one or more software code change requests 208 and then query the set of dependent nodes 219 to identify which nodes of the set of dependent nodes 219 is to be impacted by the one or more software code change requests 208. In particular embodiments, upon identifying the nodes of the set of dependent nodes 219 to be impacted by the one or more software code change requests 208, the RDF 218 may then provide an output to the node relationship manager 220. The node relationship manager 220 may then identify the directed links 221 and the relationships between the nodes of the set of dependent nodes 219 to be impacted by the one or more software code change requests 208.

In particular embodiments, upon identifying the directed links 221 and the relationships between the nodes of the set of dependent nodes 219 to be impacted, the node relationship manager 220 may then provide an output to the code change type identifier 222. The code change type identifier 222 may be utilized to identify the type of change requested by the one or more software code change requests 208. For example, while some requested code changes may include minor changes to the codebase or source code to fix one or more software bugs, other requested code changes may include more complex changes to the codebase or source code to introduce new features, interconnect one or more third-party services, and/or to customize certain business processes, for example.

In particular embodiments, upon the code change type identifier 222 identifying the type of change requested by the one or more software code change requests 208, the code change type identifier 222 may then provide an output to the recursive analysis filter 224. The recursive analysis filter 224 may be then utilized to identify and verify whether there are potentially any cascading impacts to one or more other nodes of the set of dependent nodes 219 and/or one or more other of the directed links 221. In particular embodiments, upon the recursive analysis filter 224 identifying and verifying any potential cascading impacts precipitated by the one or more software code change requests 208, the recursive analysis filter 224 may then provide an output to the graph database 226. The graph database 226 may include any graph database (GDB) suitable for storing the data outputted by the RDF 218, the node relationship manager 220, the code change type identifier 222, and the recursive analysis filter 224 as graph data (e.g., dependent nodes 219 data, directed links 221 or relationships data, and/or system 216 properties data).

In particular embodiments, a DAG data compiler 228 may access the graph data stored to the graph database 226, compile and preprocess the graph data, and provide the compiled and preprocess the graph data to the graph-based code generation engine 206. As depicted, in particular embodiments, the graph-based code generation engine 206 may include one or more generative artificial intelligence (AI) models 234 and a DAG updater component 242. In particular embodiments, the one or more generative AI models 234 may include a graph neural network (GNN) model 230 and a bidirectional encoder representations for transformer (BERT) model 232.

For example, in one embodiment, the GNN model 230 may include a graph machine-learning model (e.g., graph neural network (GNN), graph convolutional network (GCN)) of the one or more generative AI models 234 that may be trained in accordance with a supervised-learning process to generate one or more predictions of node properties 236A, links or relationships 236B, entities represented by nodes 236C, or extractions of relationships 236D based on the set of dependent nodes 219 and directed links 221 or relationships identified as being impacted by the one or more software code change requests 208. In particular embodiments, the one or more predictions of node properties 236A, links or relationships 236B, entities represented by nodes 236C, or extractions of relationships 236D as generated by the GNN model 230 may include a knowledge graph or other graph-based representation of the software code change.

In particular embodiments, upon the GNN model 230 generating the prediction of the knowledge graph or other graph-based representation of the software code change, the GNN model 230 may then provide the knowledge graph or other graph-based representation of the software code change to the BERT model 232. In particular embodiments, the BERT model 232 of the one or more generative AI models 234 may include a code generation generative model (e.g., a knowledge enhanced bidirectional encoder representations for transformer (KnowBERT) model, a code bidirectional encoder representations for transformer (Code-BERT) model) generative machine-learning model pretrained and fine-tuned to generate a prediction of textual software code 238 based on the knowledge graph or other graph-based representation of the software code change as generated by the GNN model 230.

For example, in particular embodiments, the textual software code 238 may include software code in a programming language or in natural language that may be scanned by code scanner 240, unit tested by automation testing system 244, and finally deployed to the codebase repositories 212. As further depicted, in another embodiment, the textual software code 238 may also be provided to the DAG updater component 242 for updating (e.g., changing code) each node of the set of dependent nodes 219 and each directed link of the directed links 221 identified as being impacted by the requested software code change.

Thus, in accordance with the presently disclosed embodiments, the direct acyclic graph (DAG) and generative code generation system 200 may improve the security, reliability, and maintainability of software applications, systems, and services, as well as the one or more processors 102 and memory 104 on which the software applications, systems, and services may be executed by identifying a software code change requested to be deployed, autonomously identifying the downstream instances of the software application to be impacted by the software code change, and executing a code generation generative model 234 to generate a prediction of the software code change as a graph-based representation and further generate a prediction of the generative software code 238 to update the impacted upstream or downstream instances of the software application.

Accordingly, the present embodiments for automatically generating code for software code changes may mitigate the potential for software application bugs, software application faults, software service outages, or other systemic adverse impacts that may be associated with code changes to software applications, systems, and services once tested and deployed. The present embodiments for automatically generating code for software code changes may further streamline the software development, testing, and maintenance phases of an SDLC by autonomously generating and deploying software code for otherwise repetitive and cumbersome coding tasks.

FIG. 3 illustrates a flowchart of an example method 300 for automatically generating code for software code changes, in accordance with one or more embodiments of the present disclosure. The method 300 may be performed utilizing the one or more processors 102 (e.g., locator component processor 110, validator component processor 112, and generator component processor 116) as described above with respect to FIG. 1.

The method 300 may begin at block 302 with the one or more processors 102 receiving a request for a software code change to one or more of a first instance of a software application or a plurality of second instances of a software application. For example, in one embodiment, the first instance of the software application may be represented as a first node (e.g., global node 217) of the DAG of a software application or system 216 and each instance of the plurality of second instances of the software application may be represented as one of a plurality of second nodes (e.g., set of dependent nodes 219) of the DAG of a software application or system 216. Specifically, the first node of the DAG of a software application or system 216 may include the global node 217 and the plurality of second nodes of the DAG may include a set of dependent nodes 219 having one or more dependencies on the global node 217.

In particular embodiments, the method 300 may continue at block 304 with the one or more processors 102 determining, based on the request, whether the first node or one or more nodes of the plurality of second nodes is to be impacted by the requested software code change. In particular embodiments, the method 300 may then continue at decision 306 with the one or more processors 102 confirming whether the first node or one or more nodes of the plurality of second nodes will be impacted by the requested software code change. In particular embodiments, in response to confirming that the first node (e.g., global node 217) or one or more nodes of the plurality of second nodes (e.g., set of dependent nodes 219) will not be impacted by the requested software code change, the method 300 may return to block 302 as discussed above.

On the other hand, in response to confirming that the first node (e.g., global node 217) or one or more nodes of the plurality of second nodes (e.g., set of dependent nodes 219) will be impacted by the requested software code change, the method 300 may continue at block 308 with the one or more processors 102 identifying one or more relationships between each node of the one or more nodes determined to be impacted by the requested software code change. The method 300 may continue at block 310 with the one or more processors 102 executing a first machine-learning model trained to generate a prediction of a knowledge graph based on the identified one or more relationships and the one or more nodes determined to be impacted by the requested software code change.

For example, in one embodiment, the knowledge graph may include a graph-based representation of the requested software code change. In particular embodiments, the one or more processors 102 may further execute the first machine-learning model (e.g., GNN model 230) trained to generate one or more node property predictions or one or more edge predictions corresponding to the graph-based representation of the requested software code change. In one embodiment, the first machine-learning model (e.g., GNN model 230) may include one or more of a graph neural network (GNN) or a graph convolutional network (GCN).

The method 300 may then conclude at block 312 with the one or more processors 102 executing a second machine-learning model trained to generate a prediction of textual software code based on the knowledge graph. For example, in one embodiment, the textual software code may include generative software code 238 configured to be deployed for updating each node of the one or more nodes determined to be impacted by the requested software code change. In particular embodiments, the second machine-learning model (e.g., BERT model 232) may include one or more of a bidirectional and auto-regressive transformer (BART) model, a bidirectional encoder representations for transformer (BERT) model, a knowledge enhanced bidirectional encoder representations for transformer (KnowBERT) model, a generative pre-trained transformer (GPT) model, or a graph transformer.

In one embodiment, upon generating the textual software code (e.g., generative software code 238), the one or more processors 102 may further deploy the textual software code (e.g., generative software code 238) to update each node of the one or more nodes determined to be impacted by the requested software code change. The one or more processors 102 may then update the DAG of a software application or system 216 based at least in part on the updated nodes.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:

a memory configured to store a first instance of a software application, a plurality of second instances of the software application, and one or more software code changes; and one or more processors operably coupled to the memory and configured to:

receive a request for a software code change to one or more of the first instance of the software application or the plurality of second instances of the software application, wherein the first instance of the software application is represented as a first node of a directed acyclic graph (DAG) and each instance of the plurality of second instances of the software application is represented as one of a plurality of second nodes of the DAG;

determine, based on the request, that the first node or one or more nodes of the plurality of second nodes is to be impacted by the requested software code change, and, in response:

identify one or more relationships between each node of the one or more nodes determined to be impacted by the requested software code change;

execute a first machine-learning model trained to generate a prediction of a knowledge graph based on the identified one or more relationships and the one or more nodes determined to be impacted by the requested software code change, wherein the knowledge graph comprises a graph-based representation of the requested software code change; and execute a second machine-learning model trained to generate a prediction of textual software code based on the knowledge graph, wherein the textual software code comprises software code configured to be deployed for updating each node of the one or more nodes determined to be impacted by the requested software code change.

2. The system of claim 1, wherein the first node of the DAG comprises a global node, and wherein the plurality of second nodes of the DAG comprises a set of nodes having one or more dependencies on the global node.

3. The system of claim 1, wherein the first machine-learning model comprises one or more of a graph neural network (GNN) or a graph convolutional network (GCN).

4. The system of claim 1, wherein the second machine-learning model comprises one or more of a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, a generative pre-trained transformer (GPT) model, or a graph transformer.

5. The system of claim 1, wherein the one or more processors are further configured to execute the first machine-learning model trained to generate one or more node property predictions or one or more edge predictions corresponding to the graph-based representation of the requested software code change.

6. The system of claim 1, wherein the one or more processors are further configured to deploy the textual software code to update each node of the one or more nodes determined to be impacted by the requested software code change.

7. The system of claim 6, wherein the one or more processors are further configured to update the DAG based at least in part on the updated nodes.

8. A method, comprising:

receiving a request for a software code change to one or more of a first instance of a software application or a plurality of second instances of the software application, wherein the first instance of the software application is represented as a first node of a directed acyclic graph (DAG) and each instance of the plurality of second instances of the software application is represented as one of a plurality of second nodes of the DAG;

determining, based on the request, that the first node or one or more nodes of the plurality of second nodes is to be impacted by the requested software code change, and, in response:

identifying one or more relationships between each node of the one or more nodes determined to be impacted by the requested software code change;

executing a first machine-learning model trained to generate a prediction of a knowledge graph based on the identified one or more relationships and the one or more nodes determined to be impacted by the requested software code change, wherein the knowledge graph comprises a graph-based representation of the requested software code change; and executing a second machine-learning model trained to generate a prediction of textual software code based on the knowledge graph, wherein the textual software code comprises software code configured to be deployed for updating each node of the one or more nodes determined to be impacted by the requested software code change.

9. The method of claim 8, wherein the first node of the DAG comprises a global node, and wherein the plurality of second nodes of the DAG comprises a set of nodes having one or more dependencies on the global node.

10. The method of claim 8, wherein the first machine-learning model comprises one or more of a graph neural network (GNN) or a graph convolutional network (GCN).

11. The method of claim 8, further comprising executing the first machine-learning model trained to generate one or more node property predictions or one or more edge predictions corresponding to the graph-based representation of the requested software code change.

12. The method of claim 8, wherein the second machine-learning model comprises one or more of a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, a generative pre-trained transformer (GPT) model, or a graph transformer.

13. The method of claim 8, further comprising deploying the textual software code to update each node of the one or more nodes determined to be impacted by the requested software code change.

14. The method of claim 13, further comprising updating the DAG based at least in part on the updated nodes.

15. A non-transitory computer-readable medium storing instructions that, when executed by one or more processors of a system, cause the one or more processors to:

receive a request for a software code change to one or more of a first instance of a software application or a plurality of second instances of the software application, wherein the first instance of the software application is represented as a first node of a directed acyclic graph (DAG) and each instance of the plurality of second instances of the software application is represented as one of a plurality of second nodes of the DAG;

determine, based on the request, that the first node or one or more nodes of the plurality of second nodes is to be impacted by the requested software code change, and, in response:

identify one or more relationships between each node of the one or more nodes determined to be impacted by the requested software code change;

execute a first machine-learning model trained to generate a prediction of a knowledge graph based on the identified one or more relationships and the one or more nodes determined to be impacted by the requested software code change, wherein the knowledge graph comprises a graph-based representation of the requested software code change; and execute a second machine-learning model trained to generate a prediction of textual software code based on the knowledge graph, wherein the textual software code comprises software code configured to be deployed for updating each node of the one or more nodes determined to be impacted by the requested software code change.

16. The non-transitory computer-readable medium of claim 15, wherein the first node of the DAG comprises a global node, and wherein the plurality of second nodes of the DAG comprises a set of nodes having one or more dependencies on the global node.

17. The non-transitory computer-readable medium of claim 15, wherein the first machine-learning model comprises one or more of a graph neural network (GNN) or a graph convolutional network (GCN).

18. The non-transitory computer-readable medium of claim 15, wherein the second machine-learning model comprises one or more of a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, a generative pre-trained 20 transformer (GPT) model, or a graph transformer.

19. The non-transitory computer-readable medium of claim 15, wherein the instructions further cause the one or more processors to execute the first machine-learning model trained to generate one or more node property predictions or one or more edge predictions corresponding to the graph-based representation of the requested software code change.

20. The non-transitory computer-readable medium of claim 15, wherein the instructions further cause the one or more processors to deploy the textual software code to update each node of the one or more nodes determined to be impacted by the requested software code change.

* * * * *